US008861525B1

(12) United States Patent
Durand et al.

(10) Patent No.: US 8,861,525 B1
(45) Date of Patent: Oct. 14, 2014

(54) CLOUD-BASED NETWORK PROTOCOL TRANSLATION DATA CENTER

(75) Inventors: Alain Durand, Great Falls, VA (US); David Ward, Los Gatos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 286 days.

(21) Appl. No.: 13/193,138

(22) Filed: Jul. 28, 2011

(51) Int. Cl.
*H04L 12/28* (2006.01)
*H04J 3/16* (2006.01)
*G06F 15/16* (2006.01)

(52) U.S. Cl.
USPC ...... 370/392; 370/395.52; 370/401; 370/466; 709/203; 709/230; 709/249

(58) Field of Classification Search
USPC .................... 370/205, 392, 401, 395.52, 466; 709/203, 230, 249
See application file for complete search history.

(56) References Cited

U.S. PATENT DOCUMENTS

| | | | |
|---|---|---|---|
| 6,523,068 B1 | 2/2003 | Beser et al. | |
| 7,188,191 B1 | 3/2007 | Hovell et al. | |
| 7,277,453 B2 * | 10/2007 | Chin et al. | 370/466 |
| 7,764,686 B1 * | 7/2010 | Toebes et al. | 370/392 |
| 8,131,863 B2 * | 3/2012 | Takeda et al. | 709/228 |
| 2004/0052257 A1 | 3/2004 | Abdo et al. | |
| 2004/0162909 A1 | 8/2004 | Choe et al. | |
| 2006/0062248 A1 | 3/2006 | Huang et al. | |
| 2006/0227792 A1 * | 10/2006 | Wetterwald et al. | 370/395.52 |
| 2007/0160065 A1 | 7/2007 | Mundra et al. | |
| 2007/0198735 A1 | 8/2007 | Kim et al. | |
| 2010/0202459 A1 | 8/2010 | Tsuchiya et al. | |
| 2012/0110210 A1 | 5/2012 | Huang et al. | |
| 2012/0207168 A1 * | 8/2012 | Kassi Lahlou et al. | 370/392 |

OTHER PUBLICATIONS

Postel, Jon, "Internet Protocol" Darpa Internet Program—Protocol Specification, RFC: 791, available at http://www.ietf.org/rfc/rfc791.txt, Sep. 1981, 49 pgs.
Harrington, D. et al. "An Architecture for Describing Simple Network Management Protocol (SNMP) Management Frameworks", Network Working Group, RFC 3411, The Internet Society, Dec. 2002, 60 pgs.
Deering, S. et al. "Internet Protocol, Version 6 (IPv6) Specification", Network Working Group, RFC 2460, The Internet Society, Dec. 1998, 37 pgs.
Durand et al., "Dual-Stack Lite Broadband Deployments Following IPv4 Exhaustion," draft-ietf-softwire-dual-stack-lite-06, Internet-Draft, Aug. 11, 2010, 35 pp.

(Continued)

*Primary Examiner* — Alpus H Hsu
*Assistant Examiner* — Camquyen Thai
(74) *Attorney, Agent, or Firm* — Shumaker & Sieffert, P.A.

(57) ABSTRACT

A translation data center (TDC) is described that provides cloud-based network protocol translation services. In an example system, the TDC is coupled to a first public network that includes client devices and operates according to a first network-layer protocol (NLP) and a second public network that includes content providers and operates according to a second NLP. Domain name servers within the first public network are updated to include records that resolve respective domain names for each of a plurality of content providers of the second public network to different, globally-routable network destination addresses assigned to the TDC. The TDC receives packets from the first network, transforms the packets from the first NLP to the second NLP and replaces network-layer destination addresses of the TDC with the network-layer destination addresses for the content providers.

20 Claims, 6 Drawing Sheets

(56) References Cited

OTHER PUBLICATIONS

Hankins et al., "Dynamic Host Configuration Protocol for IPv6 (DHCPv6) Options for Dual-Stack Lite," draft-ietf-softwire-ds-lite-tunnel-option-03, Internet-Draft, Jun. 24, 2010, 9 pp.

Brockners et al., "Gateway Initiated Dual-Stack Lite Deployment," draft-ietf-softwire-gateway-init-ds-lite-00, Internet-Draft, May 13, 2010, 15 pp.

Townsley et al., "IPv6 Rapid Development on IPv4 Infrastructures (6rd)," draft-ietf-softwire-ipv6-6rd-10, May 19, 2010, 20 pp.

Wikipedia entry, "Path MTU Discovery," last modified Sep. 16, 2010, 2 pp., http://en.wikipedia.org/wiki/Path_MTU_Discovery.

PowerPoint presentation, "Softwires," G6 Association, dated Sep. 22, 2008, 7 pp.., http://www.afrinic.net/training/presentation/Slides%20Softwires.pdf.

Carpenter et al., "Connection of IPv6 Domains via IPv4 Clouds," RFC 3056, Feb. 2001, 20 pp.

Despres, "IPv6 Rapid Deployment on IPv4 Infrastructures (6rd)," RFC 5569, Jan. 2010, 11 pp.

U.S. Appl. No. 12/964,473, by Olivier Vautrin, filed Dec. 9, 2010.

U.S. Appl. No. 12/952,908, by Tarun Saxena, filed Nov. 23, 2010.

\* cited by examiner

| TRANSLATION DATA CENTER GLOBAL IPV6 ADDRESSES | CONTENT PROVIDER INFORMATION |
|---|---|
| 2001:DB1:1::1 | 10.0.0.1 |
| 2001:DB1:1::2 | 20.0.0.1 |
| 2001:DB1:1::3 | s1.yoursite.com |
| 2001:DB1:1::4 | 92.0.0.1 |
| 2001:DB1:2::1 | 125.0.0.1 |
| 2001:DB1:2::2 | www.example.com |
| 2001:DB1:2::3 | 48.0.0.1 |
| 2001:DB1:2::4 | 52.0.0.1 |

FIG. 6

CLOUD-BASED NETWORK PROTOCOL TRANSLATION DATA CENTER

TECHNICAL FIELD

This disclosure relates to computer networks, and more specifically, deploying Internet Protocol version 6 across computer networks.

BACKGROUND

A computer network is a collection of interconnected devices that can exchange data and share resources according to one or more communication protocols. The communication protocols define the format and manner in which the devices communicate the data. Example protocols include the Transmission Control Protocol (TCP) and the Internet Protocol (IP) that facilitate data communication by dividing the data into small blocks called packets. These packets are individually routed across the network from a source device to a destination device. The destination device extracts the data from the packets and assembles the data into its original form. Dividing the data into packets enables the source device to resend only those individual packets that may be lost during transmission. The protocols define the format and construction of the packet, including header and payload portions of the packets.

Periodically, it is necessary to transition from one communication protocol to another. This may occur, for example, when a current communication protocol used within a network is upgraded to a newer version. As one example, the Internet is currently based on a communication protocol known as Internet Protocol version 4 (IPv4). IPv4 offers a ubiquitous network service, based on datagram (connectionless) operation, and on globally significant IP addresses to aid routing. It is becoming clear that certain elements of IPv4 are insufficient to support the growth of the Internet. For example, IPv4 makes use of a 32-bit address space. Internet Protocol version 6 (IPv6), however, makes use of a much larger 128-bit address space. However, development, standardization, implementation, testing, debugging and deployment of a new communication protocol can take a very large amount of time and energy, and is not guaranteed to lead to success.

SUMMARY

In general, this disclosure is directed to techniques for seamlessly allowing devices within networks that operate in accordance with different network-layer (i.e., layer three) protocols to co-exist and communicate with limited or no changes to the networks. For example, a translation data center (TDC) is described that provides cloud-based network protocol translation services. The TDC may be located anywhere within the network architecture and potentially hosted and maintained by a third party to provide, as one example, IPv6 network address translation service on behalf of one or more customers (e.g., service providers) to translate between the IPv6 and IPv4 network-layer protocols. The IPv6 translation service may be virtualized in the cloud such that multiple customers may be provided the IPv6 translation service using the same network device or groups of network devices. Load balancing or content distribution network techniques may be used to redirect IPv6 network traffic to the proper network device for translation and bandwidth reservation techniques may also be used to exchange the translated IPv4 traffic with the proper IPv4 server.

In one example, a content provider may utilize the cloud-based translation data center by configuring domain name system (DNS) records of a DNS server. At least one of the DNS records is configured with hostname of the content provider but which points to a globally-routable IPv6 address associated with translation data center. When a client device that resides in an IPv6 network requests content hosted by the content provider, the client device performs a lookup in the DNS records to determine the IP address of the destination device. Because of the configuration of the DNS records, the client device receives the IPv6 address of the IPv6 translation service provider as the destination address to which to send the IPv6 packet. The IPv6 translation service provider receives the IPv6 packet from the client device and translates the IPv6 specified as the destination address in the IPv6 packet into an IPv4 address of a server hosted by the content provider. The IPv6 translation service then generates a new packet in accordance with the IPv4 protocol and sends the IPv4 packet to the content provider. The IPv4 packet is configured with the IPv4 address of the IPv6 translation service as the source network address and the IPv4 network address of a content server as the destination network address. The content server generates a reply IPv4 packet having the IPv4 address of the IPv6 translation service as the destination network address. The IPv6 translation service receives the IPv4 packet and translates it into an IPv6 packet. The IPv6 packet includes the IPv6 address of the client device as the destination network address and sends the IPv6 packet to the client device.

In one example, a method includes receiving, from a client device, a packet specifying a request for content from a content provider, wherein packet conforms to a first network-layer protocol and specifies a network-layer destination address associated with a translation data center that provides translation services for network-layer protocols. The method may also include performing, with the translation data center, network address translation to select a network-layer destination address for the content provider, wherein the network-layer destination address for the content provider conforms to an address format specified by a second network-layer protocol. The method may also include transforming, with the network-based translator, the packet from conforming to the first network-layer protocol to conforming to the second network-layer protocol and replacing the network-layer destination address associated with the party translation data center in the packet with the network-layer destination address for the content provider, and forwarding the transformed packet from the translation data center to the content provider using the second network-layer protocol.

In another example, a data center includes a first network interface to communicate packets conforming to a first network-layer protocol, a second network interface to communicate packets conforming to a second network-layer protocol, a switch fabric. The data center may also include a plurality of translation devices that provide translation services to translate the packets between the first network-layer protocol and the second network-layer protocol, the plurality of translation devices interconnected to the first network interface and the second network interface of the data center by the switch fabric. Each of the plurality of translation devices may include a first interface that receives via the switch fabric packets from the first network interface that conform to the first network-layer protocol and specify network-layer destination addresses associated with the translation data center, and a translation module that performs address translation to select network-layer destination addresses for content providers based on the network-layer destination addresses specified within the packets for the translation data center, wherein the network-layer destination address for the content providers conforms to an address format specified by the second network-layer protocol. Each of the translation devices may also include a protocol conversion module that transforms the packets from the first network-layer protocol to the second network-layer protocol and replaces the network-layer destination addresses of the translation data center with the network-layer destination addresses for the content providers, and a second interface that outputs the transformed packet from the translation device to the second network interface of the datacenter for forwarding to the content providers using the second network-layer protocol.

In another example, a system includes a translation data center coupled to a first public network and a second public network, wherein the first network includes a plurality of client devices and operates in accordance with a first network-layer protocol, and wherein the second network includes a plurality of content providers and operates in accordance with a second network-layer protocol, and a domain name server located within the first public network, the domain server comprising a database that stores a plurality of records that resolve a respective domain name for each of a plurality of content providers to a different globally routable network destination address associated with the translation data center. The translation data center receives packets received from the first public network and performs address translation to select network-layer destination addresses for content providers based on network-layer destination addresses of the translation data center specified within the packets, wherein the network-layer destination addresses of the translation data center conform to an address format specified by the first network layer protocol and the network-layer destination addresses for the content providers conform to an address format specified by the second network-layer protocol. The translation data center transforms the packets from the first network-layer protocol to the second network-layer protocol and replaces the network-layer destination addresses of the translation data center with the network-layer destination addresses for the content providers.

In another example, a computer-readable storage medium is encoded with instructions for causing one or more programmable processors of a network device to receive, from a client device, a packet specifying a request for content from a content provider, wherein packet conforms to a first network-layer protocol and specifies a network-layer destination address associated with a translation data center that provides translation services for network-layer protocols. The instructions may also cause the one or more programmable processors to perform, with the translation data center, network address translation to select a network-layer destination address for the content provider, wherein the network-layer destination address for the content provider conforms to an address format specified by a second network-layer protocol. The instructions may also cause the one or more programmable processors to transform, with the network-based translator, the packet from conforming to the first network-layer protocol to conforming to the second network-layer protocol and replacing the network-layer destination address associated with the party translation data center in the packet with the network-layer destination address for the content provider, and forward the transformed packet from the translation data center to the content provider using the second network-layer protocol.

Techniques of this disclosure may provide one or more advantages. For example, the techniques described herein may enable an IPv6 client to access IPv4 resources without requiring a content provider to implement IPv6 within a data center of the content provider. By eliminating the need for a content provider to implement IPv6 within data centers, the content provider may more rapidly and more easily offer content using IPv6 as compared to conventional techniques. That is, techniques of this disclosure may enable content provided by content provider to be reachable over IPv6 by simply contracting with a third party that provides IPv6 translation service and modifying certain DNS records. In this manner, the increased maintenance and administrative overhead associated with providing IPv6 reachability that is experienced by a content provider may be reduced.

The details of one or more embodiments are set forth in the accompanying drawings and the description below. Other features, objects, and advantages will be apparent from the description and drawings, and from the claims.

BRIEF DESCRIPTION OF DRAWINGS

FIG. 6 is a conceptual diagram illustrating an example translation table consistent with this disclosure.

DETAILED DESCRIPTION

Figure 1:
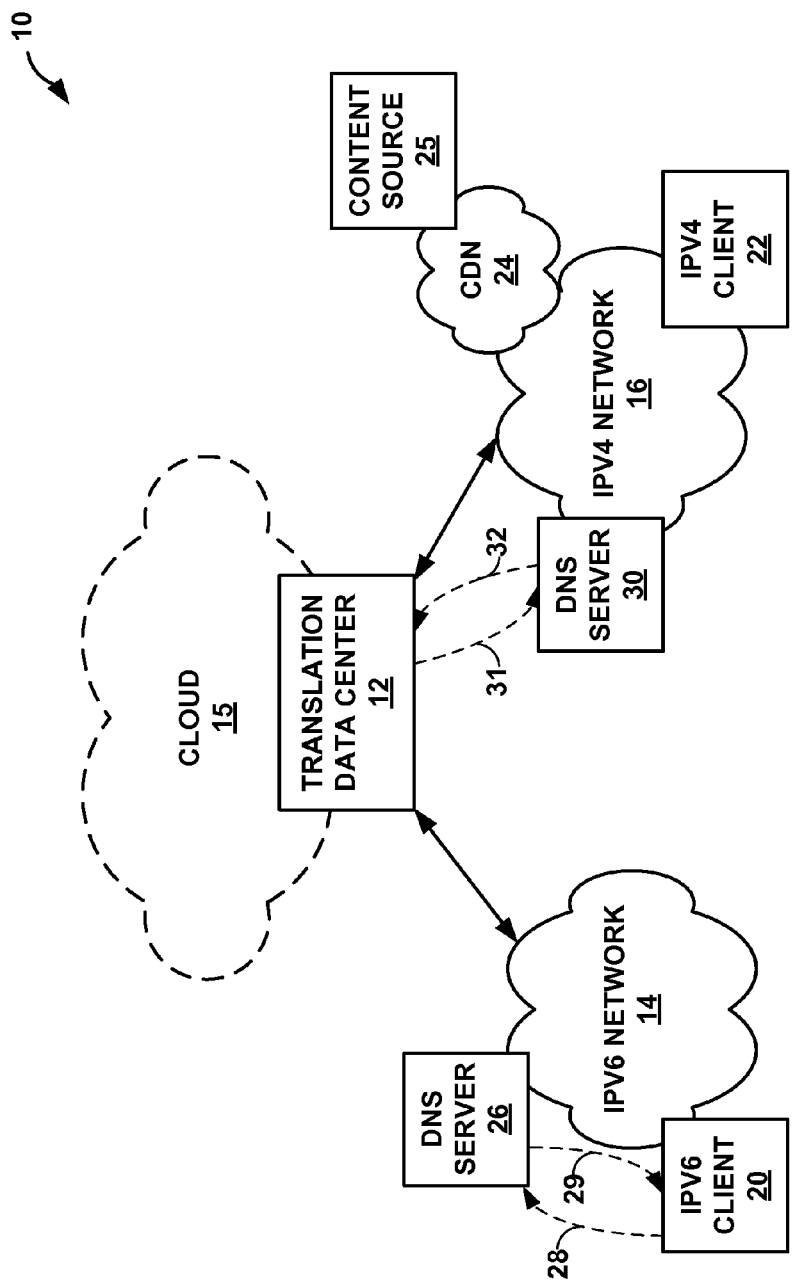
FIG. 1 is a block diagram illustrating an example network system that may implement the techniques of this disclosure.

FIG. 1 is a block diagram illustrating an example network system 10 in which Internet Protocol version 6 (IPv6) client 20 and Internet Protocol version 4 (IPv4) client 22 exchange data with content source 25 using IPv6 network 14, cloud 15, IPv4 network 16, and/or content delivery network (CDN) 24. As illustrated in FIG. 1, network system 10 includes IPv6 network 14 and IPv4 network 16. Each network within network system 10 may operate in accordance with one or more network-layer protocols (i.e., layer three of the Open Systems Interconnection (OSI) reference model). As illustrated in FIG. 1, different networks of network system 10 operate in accordance with different network-layer protocols. For example, IPv6 network 14 operate in accordance with IPv6 as described in request for comments (RFC) 2460, entitled "Internet Protocol, Version 6 (IPv6) Specification" to S. Deering et al., December 1998, the entire content of which is incorporated herein by reference. As another example, IPv4 network 16 operates in accordance with IPv4 as described in RFC 791, entitled "Internet Protocol" to Jon Postel et al., September 1981, the entire content of which is incorporated herein by reference. IPv6 network 14 and IPv4 network 16 may each be an example of a public network and may each include any set of one or more interconnected public networks, such as the Internet.

As shown in FIG. 1, cloud 15 is communicatively coupled to IPv6 network 14 and IPv4 network 16. In some examples, cloud 15 may implement a combination of IPv4 and IPv6 (e.g., by implementing an IPv4 network and an IPv6 network within cloud 15). In accordance with techniques of this disclosure, cloud 15 provides network address translation services that enable IPv6 client 20 to exchange data with content source 25 even though content source 25 is located with an IPv4 network and configured with an IPv4 network address. As illustrated in FIG. 1, cloud 15 includes translation data center 12. In general, translation data center 12 translates IPv6 packets into IPv4 packets and IPv4 packets into IPv6 packets and provides network address translation services such that the source and destination addresses of the received packets are different than the source and destination addresses of the translated packets. While shown as including a single translation data center 12, cloud 15 may include any number of translators 12. Cloud 15 may operate multiple translators in such a way as to make the multiple translators appear as a single translator to client devices and content providers.

In one example, IPv6 client 20 requests content provided by CDN 24 and content source 25. When requesting the content, IPv6 client sends a query 28 to DNS server 26 to cause DNS server 26 to retrieve an IP address associated with a hostname used by IPv6 client 20 to access the content provided by CDN 24 and content source 25. In various instances, DNS server 26 may be reachable using IPv4 or IPv6. DNS server 26 is configured with a plurality of DNS records, such as type AAAA records. The AAAA record is most commonly used to map hostnames to an IPv6 address of the host. DNS server 26 may also be configured with one or more DNS records of type A. The A records are most commonly used to map hostnames to an IPv4 address of the host. Thus, a single DNS server may be configured with A and AAAA records and may provide DNS functionality to both IPv4 and IPv6 clients. While one DNS server 26 is shown in FIG. 1, network system 10 may include two or more DNS servers that each include AAAA records and A records and each process DNS query requests.

The content provider may configure both the A and AAAA records of the DNS server to map hostnames of the content provider to various IPv4 and IPv6 addresses. In one example, the content provider configures the A records to map to the hostname associated with the requested content to a globally routable IPv4 address of CDN 24 or content source 25. However, the content provider configures the AAAA records to map to the hostname associated with the requested content to a globally routable IPv6 address of translation data center 12. Thus, when IPv6 client 20 requests the lookup of the hostname associated with the requested content in DNS server 26, IPv6 client 20 receives, as response 29, the IPv6 address of translation data center 12 from DNS server 26 rather than an IPv4 address or IPv6 address that directly corresponds to the requested content of the content provider (e.g., the IPv4 address of content source 25 or the IPv4 address that points to CDN 24). In some examples, IPv6 client 20 may not query DNS server 26 to retrieve the IPv6 address associated the hostname. For example, IPv6 client 20 retrieve the IPv6 address by accessing local configuration information that indicates the IPv6 address associated with the hostname, via an out-of-band referral, or using another name resolution system. In requesting the content, IPv6 client 20 generates a packet configured in accordance with IPv6 and having a source IPv6 address of IPv6 client 20 and a destination IPv6 address of translation data center 12. The packet is then forwarded through IPv6 network 14 to translation data center 12.

Translation data center 12 receives the packet and performs a lookup to determine the globally routable IPv4 address associated with the destination IPv6 address included in the received packet. In some examples, translation data center 12 stores a statically configured mapping table that maps the globally routable IPv6 address included as the destination address in the received packet to a globally routable IPv4 address associated with the requested content. Additional details of an example statically configured mapping table are described with respect to FIG. 6. In other examples, translation data center 12 may store a hostname associated with the requested content within the mapping table. In these examples, translation data center 12 requests the lookup of the hostname associated with the requested content by sending query 31 to DNS server 30. DNS server 30 queries the A record that corresponds to the hostname and sends the globally routable IPv4 address associated with the requested content, as response 32, to translation data center 12. In various instances, the mapping tables of translation data center 12 may store both IPv6 to IPv4 address mappings as well as IPv6 address to hostname mappings.

Translation data center 12 may also maintain a network session table or other data store to store information for communication sessions with client devices from which packets are received and communications sessions with content providers to which packets are sent. The network session table may include network interfaces on which the packets are received from a client device and network interfaces on which the packets are sent to the content providers. In some examples, translation data center 12 may operate as a proxy device for communication sessions anchored to the device.

Translation data center 12 generates a new packet configured in accordance with IPv4 based on the received packet and the mapped IPv4 address. The transformed packet includes the mapped globally routable IPv4 address as the destination address, a globally routable IPv4 address of translation data center 12 as the source address, and the data from the IPv6 packet. Translation data center 12 then forwards the generated IPv4 packet through IPv4 network 16 to CDN 24.

CDN 24 is one example of a content delivery network of a content provider that delivers content requested by client devices (e.g., IPv6 client 20 and IPv4 client 22). In some examples, CDN 24 is a network of interconnected devices that cooperate to distribute content to clients using one or more services. Such content may include, for instance, streaming media files, data files, software, domain name system information, documents, and database query results. Accordingly, examples, of application services offered by CDN 24 may include hypertext transfer protocol (HTTP), Real Time Streaming Protocol (RTSP) media streaming, Real Time Message Protocol (RTMP) streaming, advertising, and file transfer protocol (FTP). In some examples, CDN 24 may be physically located within a single data center maintained by the content provider.

In one example, CDN 24 may employ an Application-Layer Traffic Optimization (ALTO) service to optimize the performance of CDN 24. In general, the ALTO service enables CDN 24 to influence the selection process of particular content sources (e.g., content source 25) within CDN 24 to further content provider objectives, such as load balancing, service-level discrimination, accounting for bandwidth constraints, and other objectives. CDN 24 may include an ALTO server for providing the ALTO service. The ALTO server stores a network map and cost map for CDN 24. The network map stored by the ALTO server includes network location identifiers, or PIDs, that each represents one or more network devices in CDN 24. The cost map includes cost entries for pairs of PIDs represented in the network map and an associated value that represents a cost to traverse a network path between the members of the PID pair. The ALTO server may use the network map and cost map to select a lower cost content server for delivery of the requested content, which may optimize the performance of the CDN 24.

When the IPv4 packet sent from translation data center 12 reaches CDN 24, the IPv4 packet may be directed to any number of different content sources of CDN 24, including content source 25. Content source 25, in one example, is a server configured to provide content to client devices using CDN 24. In this example, content source 25 stores or otherwise sources content, which, as used herein, typically refers to any data commonly transmitted and/or stored within a network, such as web-based applications, images, documents, web pages, video data, audio data (including voice data), web-based games, scripts, or any other type of content capable of being delivered via a network. Content available on content source 25 may be sent for the purpose of, for example, web and videoconferencing, stock quote streaming, streaming television (commonly known as Internet protocol television or IPTV), and other applications. Continuing the example where content source 25 is a content server, content source 25 may be a high-end server, a personal computer, a laptop computer, a data center, an application server, a digital video camera, an intermediate network device, a network appliance, a supercomputer, a mainframe computer, a telephone handset, a microphone, a combination of such devices, or any other type of device capable of sourcing content over CDN 24. While shown in FIG. 1 as including one content source 25, network system 10 and CDN 24 may include any number of content servers that deliver content to client devices using CDN 24.

Content source 25 retrieves the requested content based on the IPv4 packet received from translation data center 12 and generates a new IPv4 packet that includes the requested content. The newly generated IPv4 packet (i.e., a response IPv4 packet) includes the globally routable IPv4 address associated with the requested content as the source IPv4 address and the globally routable IPv4 address of translation data center 12 as the destination IPv4 address. Content source 25 forwards the response IPv4 packet through CDN 24 and IPv4 network 16 to translation data center 12.

Translation data center 12 receives the response IPv4 packet from content source 25 and performs at least one lookup to determine the globally routable IPv6 address associated with the destination IPv4 address included in the response packet as the source IPv6 address for a new IPv6 response packet generated by translation data center 12. In some examples, translation data center 12 performs an additional lookup in the network session table or other dynamically configured data store to determine the globally routable IPv6 address associated with IPv6 client 20 as the destination IPv6 address of the IPv6 response packet. The destination IPv6 address is determined based at least on an interface on which the packet was received and the source IPv4 address of the packet. Translation data center 12 generates a new packet configured in accordance with IPv6 that includes the globally routable IPv6 address of translation data center 12 as the source address, the globally routable IPv6 address of client device 20 as the destination address, and the data included in the received IPv4 response packet. Translation data center 12 then forwards the transformed IPv6 packet to client device 20 using IPv6 network 14.

Content providers routinely collect information about received network traffic (e.g., source IP addresses, content requested, etc. . . . ). However, because translation data center 12 changes the source address of the packet forwarded to the content provider from the IPv6 address of IPv6 client 20 to the IPv4 address of translation data center 12, the network traffic that originates from IPv6 client devices appears, to the content provider, as originating from translation data center 12 when the network traffic does not actually originate from translation data center 12. In one example, translation data center 12 may maintain network traffic information about the IPv6 packets received by translation data center 12 and provide that network traffic information to the content provider. The content provider may then combine the network traffic information collected by translation data center 12 with the network traffic information collected by the content provider to generate more accurate network traffic information.

In this manner, a content provider may make content provided by a content delivery network configured in accordance with IPv4 available to client devices configured in accordance with IPv6 without requiring the implementation of IPv6 within the content delivery network. By eliminating the requirement to implement IPv6 within the content delivery network in order to provide IPv6 reachability to IPv6 clients, the content provider may more easily, quickly, and cheaply provide IPv6 reachability as compared to conventional techniques. For example, techniques of this disclosure may enable a content provider gain IPv6 reachability by subscribing to an IPv6 to IPv4 translation service provided by a third party and configuring a plurality of DNS records and without making changes to the network architecture of the content distribution network. Further, by aggregating network traffic statistics of the IPv6 traffic as measured by the translator with the IPv4 network traffic statistics as measured by the content provider, the content provider may maintain complete network traffic information even through the network traffic received by the content provider that passes through the translator appears, to the content provider, as originating from the translator.

Figure 2:
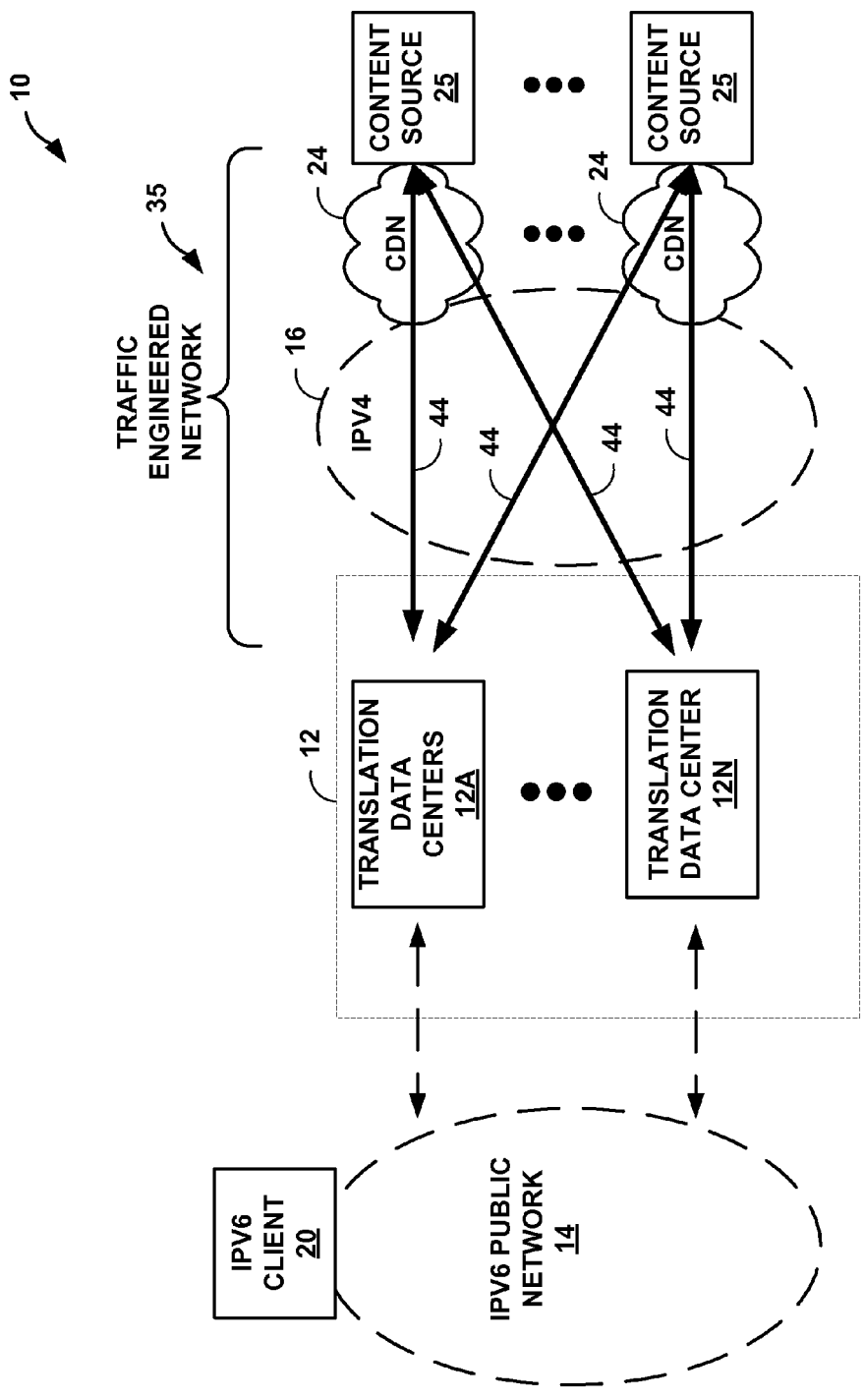
FIG. 2 is a block diagram illustrating additional details of an example of the network system of FIG. 1.

FIG. 2 is a block diagram illustrating additional details of one example of network system 10. As illustrated in FIG. 2, network system 10 includes IPv6 public network 14, translation data center 12, IPv4 network 16, content distribution networks (CDNs) 24, and content sources 25. As described above, translation data center 12 may include multiple virtual or physical translators that may be physically located in diverse geographic locations. Translation data center 12, as shown in FIG. 2, includes a plurality of translation data centers 12A-12N that may each provide translation services to one or more content providers and the corresponding CDNs 24.

In the example of network system 10 shown in FIG. 2, network traffic between one or more of the translation data centers 12 and content sources 25 is engineered to provide Quality of Service (QoS) traffic management to support a particular level of throughput between translation data centers 12 and content sources 25. Thus, the network traffic flowing between translation data centers 12 and content sources 25 may be referred to as flowing over traffic engineered network 35.

To provide the QoS capabilities, traffic engineered network 35, in one example, implements Multi-Protocol Label Switching (MPLS). MPLS is a mechanism used to engineer traffic patterns within IP networks. MPLS may be viewed as a protocol that allows packet-based networks to emulate certain properties of a circuit-switched network. By utilizing MPLS, a source device (e.g., translation data center 12A) can request a path through a network to a destination device (e.g., one of content sources 25). The requested path may be referred to as a Label Switched Path (LSP). An LSP defines a distinct path through the network to carry MPLS packets from the source device to a destination device. Each router along an LSP allocates a label and propagates the label to the closest upstream router along the path for use in forwarding MPLS packets along the path. Routers along the path cooperatively perform MPLS operations to forward the MPLS packets along the established path. A variety of protocols exist for establishing LSPs. For example, the Label Distribution Protocol (LDP), and the Resource Reservation Setup Protocol (RSVP).

As shown in FIG. 2, translation data centers 12 and content sources 25 exchange data using LSPs 44. In an example where IPv6 client 20 requests content provided by a content source 25, the IPv6 request packet is forwarded to a translation data center 12 (e.g., translation data center 12A) over IPv6 public network 14 as described with respect to FIG. 1. Translation data center 12A transforms the IPv6 request packet into an IPv4 request packet and forward the IPv4 request packet over the appropriate one of LSPs 44 to reach the one of content sources 25 that provides the requested content. Content source 25 retrieves the requested content and forwards the requested content in an IPv4 response packet that is forwarded using the appropriate one of LSPs 44 to translation data center 12A. Translation data center 12A translates the IPv4 response packet into an IPv6 response packet and forwards the IPv6 response packet to IPv6 client 20 using IPv6 public network 14.

Figure 3:
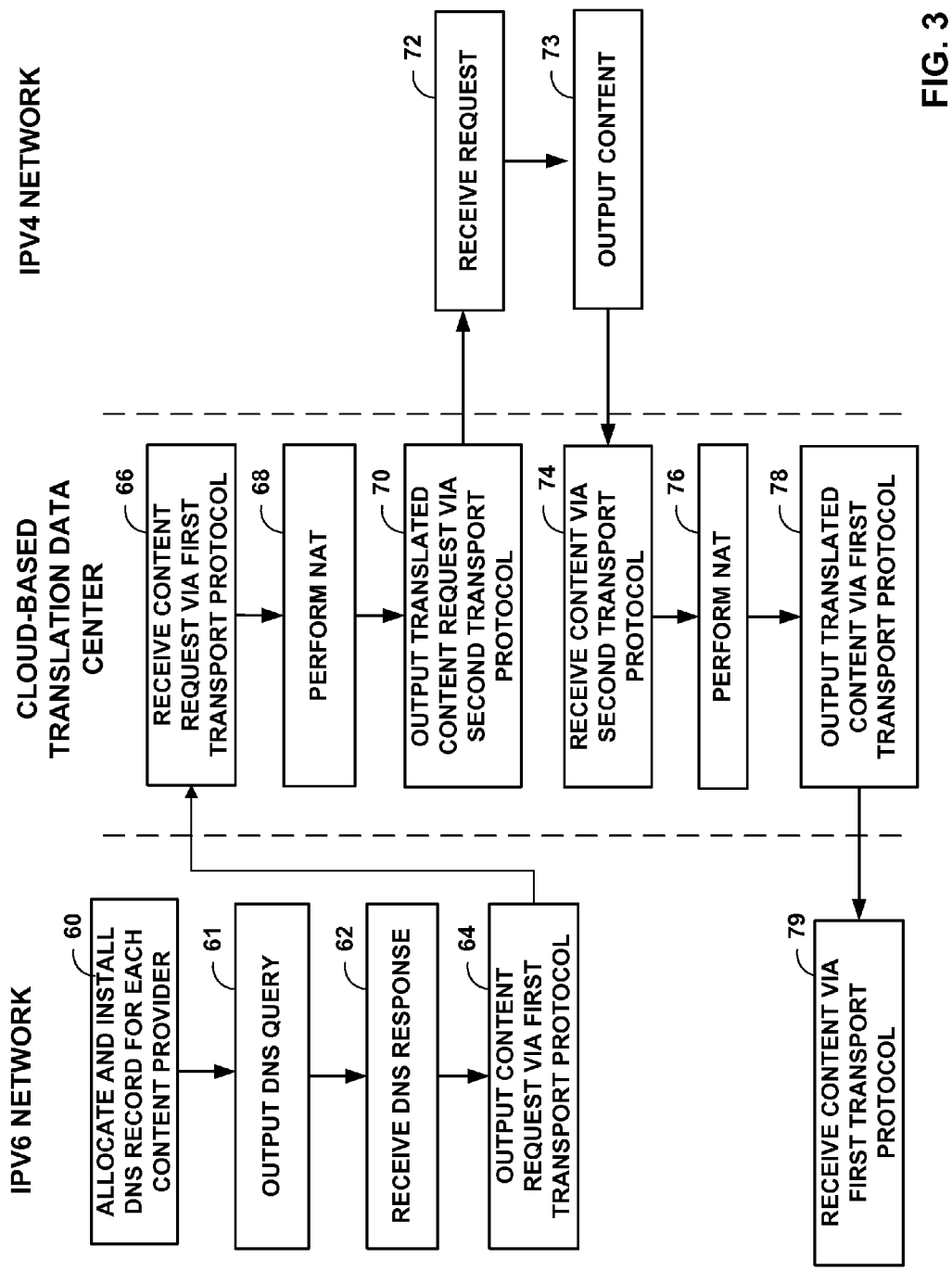
FIG. 3 is a flowchart illustrating an example process for retrieving content stored in an IPv4 network from an IPv6 client.

FIG. 3 is a flowchart illustrating an example process for retrieving content stored in an IPv4 network from an IPv6 client. For purposes of clarity, the example process shown in FIG. 3 will be described with respect to network system 10 of FIG. 1. However, the example process illustrated in FIG. 3 should not be considered as being limited to the specific functional components illustrated in FIG. 1.

Initially, an administrator associated with translation data center 12 or the content providers allocate and install DNS records for each content provider that uses the translation service (60). In one example, the first network-layer protocol is IPv6 and the second network-layer protocol is IPv4. In various instances, the content service provider works with the translation service provider to properly map hostnames to IPv6 and IPv4 addresses in order to implement techniques of this disclosure. The content provider may permit the translation service provider permission to modify DNS records (e.g., type AAAA records) to cause a hostname of the content provider to resolve the globally routable IPv6 address of the translation service provider. Alternatively or in addition, the translation service provider may inform the content service provider of a globally routable IPv6 address that the content service provider should use when configuring the AAAA records. In either instance, the content service provider informs the translation service provider of the IPv4 address associated with the hostname such that the translation service provider may populate the statically configured IPv6 and IPv4 mapping table maintained by the translation service provider.

IPv6 client 20, when requesting content provided by content source 25, outputs a DNS query 28 to DNS server 26 in order to resolve a hostname with an IP address (61). Because IPv6 client 20 is configured with IPv6, IPv6 client 20 requests an AAAA record associated with the hostname from DNS server 26. Thus, DNS server 26 queries the AAAA record associated with the hostname and returns the IPv6 address 29 mapped to the hostname in the AAAA record to IPv6 client 20 (62). IPv6 client generates an IPv6 packet as a content request and outputs the content request using a first network-layer protocol (64). The content request includes the received IPv6 address of translation center 12 as the destination address and the IPv6 address associated with IPv6 client 20 as the source address.

Translation data center 12 receives the content request from IPv6 client 20 via the first network-layer protocol (66). Translation data center 12 performs network address translation on the content request in order to transform the content request from being configured in accordance with the first network-layer protocol to being configured in accordance with the second network protocol (68). In transforming the packet, translation data center 12 accesses a database within translation data center 12 to identify one of a plurality of network-layer destination address for the content provider (e.g., configured in accordance with the second network-layer protocol) that is mapped to the network-layer destination address of translation data center 12 (e.g., configured in accordance with the first network-layer protocol) specified within the content request. That is, the database stores a mapping between network-layer addresses configured in accordance with two different transport protocols. As one example, translation data center 12 accesses the database to retrieve a mapping of the IPv6 destination address included in the content request to an IPv4 destination address associated with the content provider.

As another example, translation data center 12 accesses the database to retrieve a mapping of the IPv6 destination address included in the content request to a hostname associated with the requested content. Translation data center 12 performs a DNS resolution for an A record on the mapped hostname to retrieve the globally routable IPv4 address associated with the requested content. In various instances, the result of the DNS request is stored in a cache of translation data center 12 and the cache may be queried for subsequent packets. The cached DNS result may be maintained for a maximum lifetime of the time to live (TTL) associated with the A record returned by the DNS.

Translation data center 12 generates a new content request configured in accordance with IPv4 that includes the mapped IPv4 address as the destination address and a globally routable IPv4 address associated with translation data center 12 as the source address. In some examples, translation data center 12 also maintains a session table that is configured to store information about communication sessions of IPv6 clients. The session table stores information for communication sessions with client devices from which packets are received on a first interface of translation data center 12 and communication sessions with content providers to which packets are sent on a second interface of translation data center 12.

Translation data center 12 outputs the content request configured in accordance with the second network protocol and generated during the NAT process via the second network protocol (70). In one example, the content request is forwarded through IPv4 network 16 to CDN 24 and content source 25. Content source 25 receives the content request (72), retrieves the requested content, generates a response packet that includes the requested content, and outputs the response packet (73). The response packet includes the globally routable IPv4 address of the content provider as the source address and the globally routable IPv4 address of translation data center 12 as the destination address. The requested content is forwarded through IPv4 network 16 to translation data center 12.

Translation data center 12 receives the content in the response packet via the second network-layer protocol (74), performs NAT on the response packet, and transforms the response packet from being configured in accordance with the second network-layer protocol to being configured in accordance with the first network-layer protocol (76). Translation data center 12 performs NAT to select a network-layer destination address for translation data center 12 and a network-layer destination address for IPv6 client 20 that each conform to the first network-layer protocol. For example, translation data center 12 accesses the database within translation data center 12 that stores the globally routable IPv6 and IPv4 mappings to map the IPv4 destination address included in the response packet to the IPv6 address associated with translation data center 12. Translation data center 12 may also access the session table to identify the IPv6 address of IPv6 client 20. The session table associates the communication session of IPv6 client 20 to a respective communication session with the content provider. Translator retrieves the IPv6 address of IPv6 client 20 of the communication session of the response packet and includes the retrieved IPv6 address as the destination address of the translated response packet. The translated response packet is generated by translation data center 12 based on the content included in the response packet received via the second network-layer protocol from the content provider. The translated response packet is configured in accordance with the first network-layer protocol and includes the globally routable IPv6 address associated with IPv6 client 20 as the destination address and the globally routable IPv6 address of translation data center 12 as the source address. Translation data center 12 outputs the response packet (i.e., the requested content) via the first network-layer protocol (78). The requested content is forwarded through IPv6 network 14 to IPv6 client 20. IPv6 client 20 receives the requested content (79).

Figure 4:
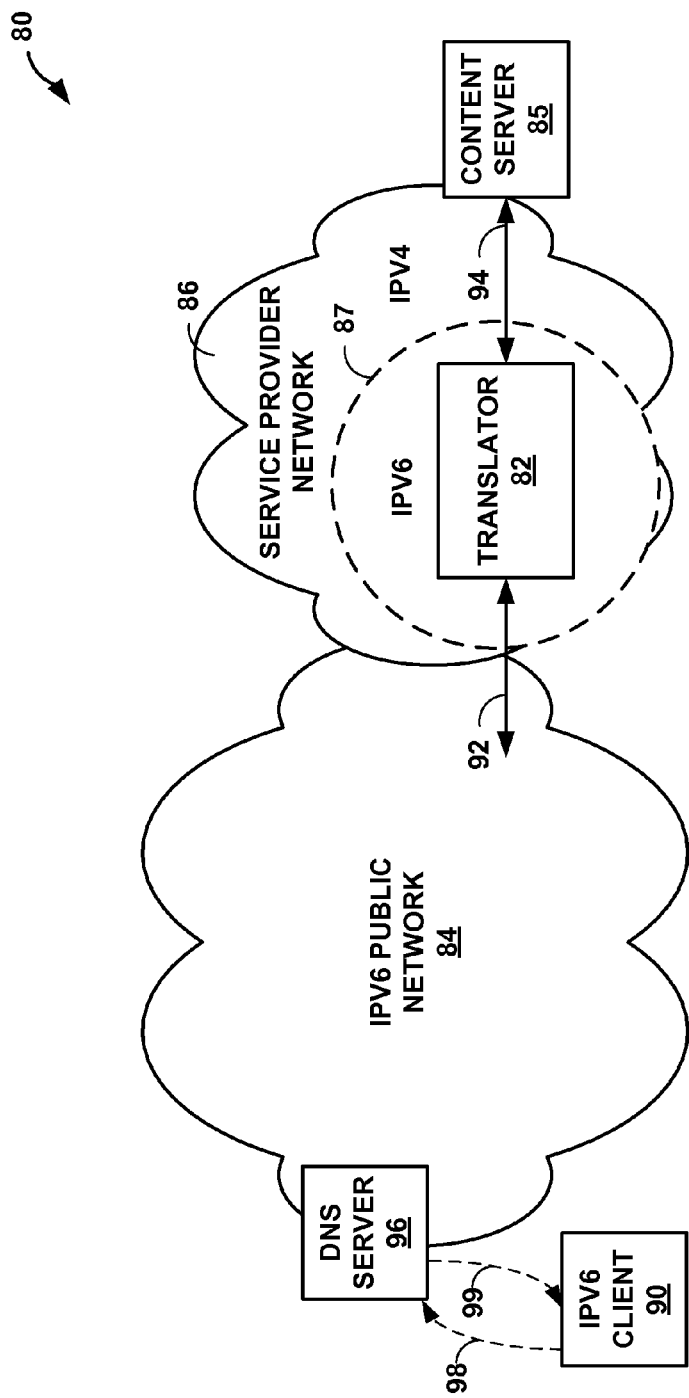
FIG. 4 is a block diagram illustrating another example network system that may implement techniques of this disclosure.

FIG. 4 is a block diagram illustrating another example network system 80. As illustrated in FIG. 4, network system 80 includes IPv6 public network 84 and service provider network 86. In general, service provider network 86 is a public network that is owned and operated by an Internet service provider (ISP) to provide network access to various client devices and content servers. Service provider network 86 is shown in FIG. 4 as including a first portion of service provider network 87 configured in accordance with a first network-layer protocol (e.g., IPv6) and the remained of service provider network 86 configured in accordance with a second network-layer protocol (e.g., IPv4). Network system 80 is one example network architecture that may be used when implementing a traffic-engineered network, such as traffic-engineered network 35 described with respect to FIG. 2.

In the example illustrated in FIG. 4, translator 82 is coupled to IPv6 portion 87 of service provider network 86 and the IPv4 portion of service provider network 86. By maintaining an IPv4 portion of service provider network 86, the service provider may provide IPv4 Internet connectivity to customers without requiring the customers to implement IPv6. That is, customers who have only IPv4 resources may connect to the IPv4 portion of service provider network 86 even though the service provider has implemented IPv6 network 87 within a portion of the service provider network.

Techniques of this disclosure may enable a content provider who relies up service provider network 86 for IPv4 Internet connectivity to have IPv6 reachability for IPv4 resources of the content provider (e.g., content server 85). For example, DNS server 96 may be configured with one or more AAAA records that resolve one or more hostnames of the content provider (e.g., a hostname associated with content server 85) to a globally routable IPv6 address of translator 82. Thus, when IPv6 client 90 requests content from the content provider, IPv6 client 90 sends a DNS query 98 to DNS server 96 to map a hostname of a content provider to the IPv6 address of translator 82. DNS server 96 sends query response 99 to IPv6 client 90. IPv6 client 90 generates the content request (e.g., an IPv6 packet having the IPv6 address of IPv6 client 90 as the source address and the IPv6 address of translator 82 as the destination address) and forwards the request to translator 82 using IPv6 public network 84.

Translator 82 receives the content request over link 92 that couples IPv6 public network 84 with IPv6 network 87 of service provider network 86. Link 92 is configured in accordance with IPv6, a first network transport protocol, and sends and receives packets configured in accordance with the first network transport protocol. Translator 82 transforms the content request from being configured in accordance with the first network transport protocol to being configured in accordance with a second network transport protocol (e.g., IPv4). The transformed content request, in various instances, includes a globally routable IPv4 destination address of content server 85 and a globally routable IPv4 source address of translator 82. Translator 82 outputs the transformed content request over link 94. In one example, link 94 is configured in accordance with the IPv4 and sends and receives packets configured in accordance with IPv4. The transformed content request is forwarded through the IPv4 portion of service provider network 86 to content server 85. Translator 82 also translates IPv4 packets received from content server 85 (e.g., the requested content) into IPv6 packets that are forwarded to IPv6 client 90 using techniques similar to those described above with respect to translation data center 12 of FIG. 1.

In this manner, techniques of this disclosure may facilitate a staggered deployment of IPv6 network capabilities within a service provider network while providing IPv6 reachability to content provider networks and content servers configured in accordance with IPv4. Thus, a service provider may offer the translation service to its customers, enabling the customers (e.g., content providers) to deliver the customers' content over IPv6 even though the customers connect the content servers to the service provider network using IPv4. Further, as the service provider changes additional portions of service provider network 86 from operating in accordance with IPv4 to operating in accordance with IPv6, the service provider may move translator 82 within the network architecture of service provider network 86 such that IPv6 reachability of the IPv4 content provider resources is maintained.

Figure 5:
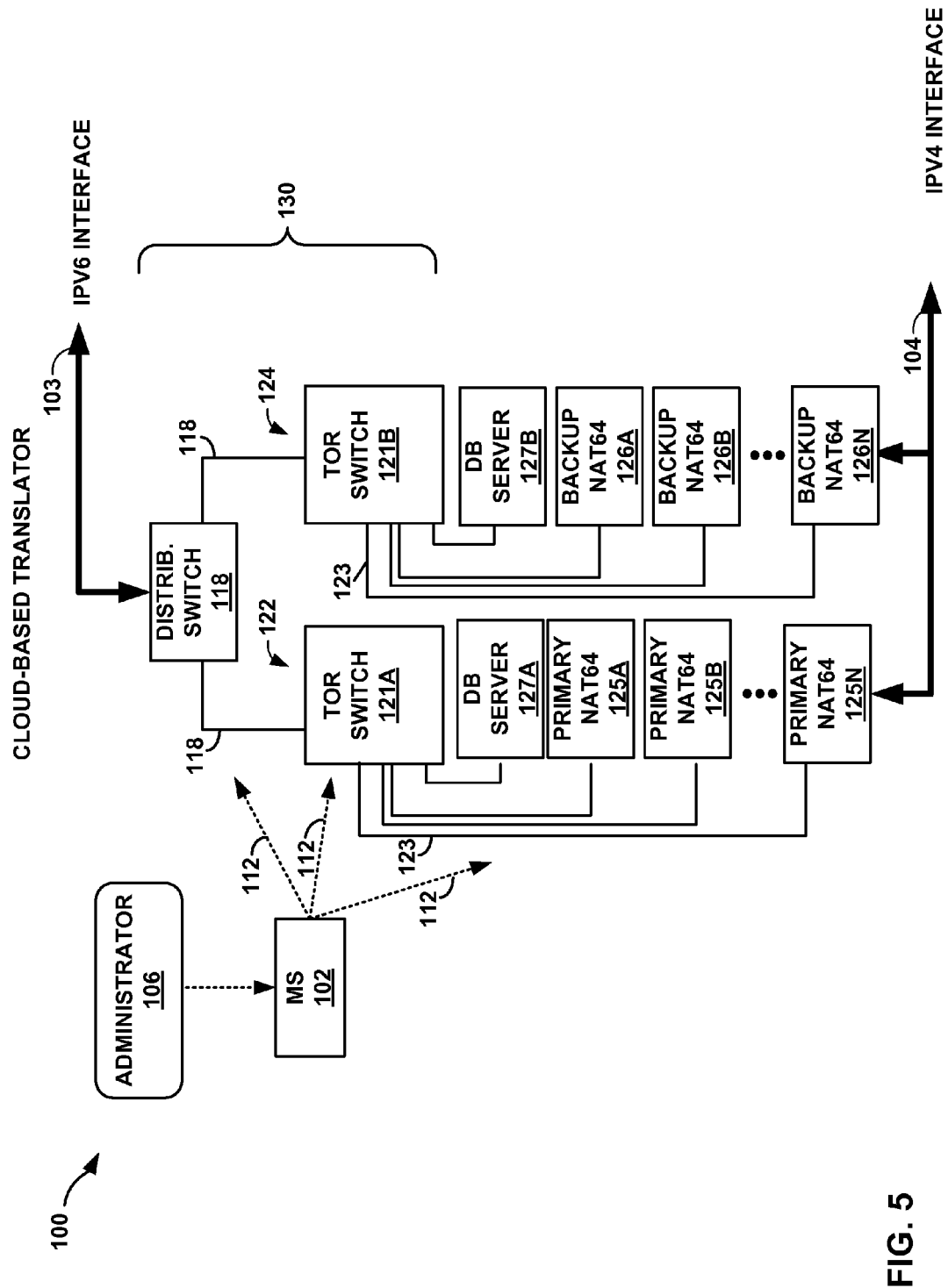
FIG. 5 is a block diagram illustrating an example cloud-based IPv6 to IPv4 translation services hosted within a data center.

FIG. 5 is a block diagram illustrating an example cloud-based IPv6 to IPv4 translation data center 100. Data center 100 may be one example of cloud 15 and/or translation data center 12 of FIG. 1, a translation data center 12A-12N of FIG. 2, or translator 82 of FIG. 4. In this example, data center 100 includes is shown in simplified form have two distinct racks or areas 122 and 126. Storage racks 122 and 124 include database (DB) server 127A and a set of primary NAT64 devices 125A-125N, and database server 127B and a set of backup NAT64 devices 126, respectively. In general, NAT64 devices 125, 126 perform network address translation between IPv6 and the IPv4 addresses and support communication between IPv6 interface 103 and IPv4 interface 104. Each of NAT64 devices 125, 126 In general, database servers 127A, 127B store communication session information and/or address mapping information.

Although not shown in FIG. 5, data center 100, in some examples, may include a load balancer that receives IPv6 packets associated with communication sessions of IPv6 clients and distributes the communication sessions to different primary NAT64 devices 125. The load balancer distributes the packets from IPv6 interface 103 to NAT64 devices 125, 126 based on at least a loading condition of NAT64 devices 125, 126 (e.g., an amount of work being performed each of NAT64 device 125, 126).

Each of primary NAT64 devices 125 performs all the necessary translations needed to transfer packets from an IPv6 network into an IPv4 network, and vice versa, for the communication sessions allocated to the device. Each of NAT64 device 125, 126 includes a translation module that performs the address translations. State information associated with each of the communication sessions may be replicated to one or more of backup NAT devices 126, which are configured to seamless transition to primary NAT64 devices in the event of a failure of any of primary NAT64 devices 125. Each of NAT64 devices 125, 126 may maintain a NAT-mapping between IPv6 and IPv4 addresses and may operate as a proxy device for communication sessions anchored to the device. This address mapping is generally dynamically created by NAT64 devices 125, 126 when receiving initial packets from the IPv6 network to be translated to the IPv4 network.

Each of NAT64 devices 125, 126 may include at least two interfaces, a translation module and a protocol conversion module. The interfaces may, for example, include physical interfaces, virtual interfaces on one physical interface, a single interface configured with both IPv4 and IPv6, or any combination thereof. One of the interfaces receives packets from IPv6 interface 103 via switch fabric 130. The packets specify network-layer destination addresses associated with data center 100. The translation module performs address translation to select network-layer destination addresses for content providers based on the network-layer destination addresses specified within packets for the data center 100. The protocol conversion module transforms the packets from the first network-layer protocol to the second network layer protocol (e.g., from IPv6 to IPv4) and replaces the network-layer destination addresses of data center 100 with the network-layer destination addresses for the content providers. The protocol convention modules may also transform the packets from the second network-layer protocol to the first network-layer protocol (e.g., from IPv4 to IPv6) and replace the network-layer source addresses for the content providers with the network-layer source addresses of data center 100. A second interface of NAT64 devices 125, 126 outputs the transformed packets from the NAT64 device 125, 126 to IPv4 interface 104 for forwarding to the content providers.

In the example illustrated in FIG. 5, NAT64 devices 125, 126 and DB servers 127A, 127B are coupled to top-of-rack (TOR) switches 121A, 121B, which provide connectivity to the internal switch fabric 130 of data center 100. In this example, switch fabric 130 is provided by interconnected top-of-rack (TOR) switches 121A, 121B and distribution layer switch 118.

Management system 102 is a combination of hardware and software to monitor and administer the switching components of switch fabric 130 using a protocol such as the Simple Network Management Protocol (SNMP), which conforms to a standard defined by the Internet Engineering Task Force (IETF) to perform such configuration tasks. That is, in this example, network administrator 106 may use management system 102 to manage the configuration of switches 118, 121A and 121B, NAT64 devices 125, 126, database servers 127A, 127B, and other devices of data center 100. In this manner, the switching components, storage components, NAT64 devices may be referred to as managed network devices having configuration data that is controlled by and deployed from management system 102.

For example, network administrator 106 may use management system 102 to send configuration data via network messages 112 (e.g., SNMP messages) to any of the managed network devices. As one example, management system 102 also allows administrator 106 to configure NAT64 devices 125, 126 to function as either primary or backup devices such that failure of a primary NAT64 device 125 causes failover to a backup NAT64 device 126. Management system 102 may also gather information via SNMP from each managed network device to monitor the status of switch fabric 30. Using this information, management system 102 develops data describing of the physical topology of switch fabric 30. Management system 102 may also monitor faults in the network and collect statistics about each managed network device. Administrator 106 may use this information to manage data center 100 and quickly respond to problems within the data center. Further details regarding SNMP can be found in Harrington et al., RFC 3411, "An Architecture for Describing Simple Network Management Protocol (SNMP) Management Frameworks," Network Working Group, the Internet Engineering Task Force draft, December 2002, available at http://tools.ietf.org/html/rfc3411, the entire contents of which are incorporated herein by reference. Although the examples described herein are illustrated using SNMP, other configuration protocols may also used to implement aspects of the present disclosure. Examples of configuration protocols may include Common Management Information Protocol (CMIP), Transaction Language 1 (TL1), or any other suitable protocol.

Management system 102 may also include hardware and software to operate as a storage management system (SMS) that allows administrator 106 to schedule and control the specific data transfer operations carried out within data center 100. For example, SMS 4 allows administrator 106 to define storage data transfer operations between database servers 127A, 127B as well as allowing the administrator to monitors the resource usage, health, and contents of database servers 127A, 127B.

For example, database servers 127A, 127B may include various types of storage systems, such as Storage Area Networks (SANs) and Network-attached Storage (NAS), and provide large volumes of computer-readable storage media. Examples of such storage media include magnetic hard discs, optical discs, and tape backup systems or other archive systems.

Switch fabric 130 includes one or more interconnected managed network devices. A managed network device may include a switch, router, or other network device capable of transmitting network packets. Top-of-rack (TOR) switches 121A, 121B provide connected storage devices NAT64 devices 125A-N, 126A-N with connectivity to switch fabric 30 and IPv6 interface 103. More generally, TOR switches 121A, 121B form the access layer of the switch fabric and provide devices with access to services provided by the distribution layer switches, e.g., switch 118. NAT64 devices 125A-N, 126A-N are connected to TOR switches by an access layer connection 123. Access layer connection 20 may be, e.g., a Gigabit Ethernet connection. TOR switches 121A, 121B may provide layer 2 (MAC address) and/or layer 3 (IP address) switching functionality. Distribution layer switch 118 is typically on of several such switches that function to aggregate connections of access layer switches, e.g., TOR switches 121A, 121B. Distribution layer switch 118 is connected to TOR switches 121A, 121B by distribution layer connections 118. Distribution layer connections 118 may be, e.g., a Gigabit Ethernet connections. Data en route from one storage device to another (e.g., from database server 127A to database server 127B) may pass through one or more TOR switches and one or more distribution layer switches.

NAT64 devices 125A-N, 126A-N may access network-layers address mapping and communication session information stored in database servers 127A, 127B. Database servers 127A, 127B may include one or more database management systems (DBMS) executing on database servers 127A, 127B. In some examples, database server 127B is a backup database server to database server 127A and may include a mirrored copy of the information stored by database server 127A. In these examples, if there is a failure of a primary NAT64 device 125 and/or database server 127A, datacenter 100 may failover to a backup NAT64 device 126 and/or database server 127B.

Each of database servers 127A, 127B may store a network session table that stores information for communication sessions with client devices from which packets are received on IPv6 interface 103 and communications sessions with content providers to which packets are sent on IPv4 interface 104. NAT64 devices 125, 126 automatically maintain the network session tables such that the communication session information is automatically added, deleted, or modified in the network session tables as packets are received from client devices and content providers over IPv6 interface 103 and IPv4 interface 104, respectively.

Each of database servers 127A, 127B store one or more translation tables for translating between a first network transport protocol and a second network transport protocol. The translation tables include a plurality of globally routable network addresses configured in accordance with the first network transport protocol for data center 100, a plurality of globally routable network addresses configured in accordance with the second network transport protocol for a plurality of content providers, and data defining a mapping that associates each of the plurality of globally routable network addresses for data center 100 to a respective one of the globally routable network addresses for the plurality of content providers. NAT64 devices 125, 126 may perform network address translation by identifying the network-layer destination address for the content providers that are mapped to the network-layer destination address of data center 100 specified within the packets received from IPv6 interface 103.

FIG. 6 is a conceptual diagram illustrating an example translation table 150 consistent with this disclosure. For purposes of illustration, translation table 150 may be described below within the context of data center 100 of FIG. 5. Translation table 150 may be stored within database server 127A or 127B and may be accessed by NAT65 devices 125, 126 when, for example, NAT64 devices 125, 126 perform network address translation in accordance with techniques of this disclosure.

In this example embodiment, translation table 150 includes a first column of translation data center global IPv6 addresses and a second column of content provider information. A single translation table 150 may include entries for two or more translator devices or virtual translators. For example, translation table 150 includes eight example entries, represented as rows. The first four rows, in one example, correspond to entries maintained by a first translator device or virtual translator for a first content provider. Address mapping group 152 may correspond to content sources maintained by a content provider that uses the translation services provided by data center 100 for IPv6 reachability to the IPv4 content sources of the content provider. Address mapping group 154 may correspond to content sources maintained by a different content provider that uses the translation services provided by data center 100 for IPv6 reachability to the IPv4 content sources of the second content provider.

When data center 100 receives a packet from a client device via IPv6 interface 103, the packet is directed to one of NAT64 devices 125, 126 (e.g., NAT64 125A). NAT64 device 125A receives the packet, extracts the IPv6 destination address from the packet and identifies the IPv4 destination address associated with IPv6 destination address from the packet. In one example, the IPv6 destination address is the value "2001:DB:1:1::4". In this example, NAT64 device 125A accesses database server 127A and identifies the value "92.0.0.1" as the IPv4 address associated with "2001:DB:1:1::4". NAT64 device 125A generates an IPv4 packet based on the IPv6 packet, includes the value "92.0.0.1" as the IPv4 destination address, and outputs the IPv4 packet over IPv4 interface 104. In another example, the IPv6 destination address is the value "2001:DB1:1::3". In this example, NAT64 device 125A accesses database server 127A and identifies the hostname "s1.yoursite.com" as the hostname associated with "2001:DB1:1::3". NAT64 device 125A performs a DNS resolution for an A record on the hostname "s1.yoursite.com" to retrieve the IPv4 address associated with the hostname (e.g., the value "44.0.0.1").

If data center 100 receives another packet from a client device via IPv6 interface 103 that corresponds to a different content provider, a different one of NAT64 devices 125, 126 may process the packet and perform the network address translation techniques described herein. For example, if the other received IPv6 packet includes a destination IPv6 address of "2001:DB1:2::3", NAT64 device 125B may process the packet. In addition, or alternatively, multiple virtual translator devices may be implemented across NAT64 devices 125, 126. In either example, the IPv6 address "2001:DB1:2::3" is included in address mapping group 154 that is associated with the second content provider and maps to the IPv4 address "48.0.0.1" of the second content provider. NAT64 devices 125, 126 translate the IPv6 packet into an IPv4 packet having an IPv4 destination address of "48.0.0.1" and output the IPv4 packet over IPv4 interface 104.

When data center 100 receives a packet from a content provider via IPv4 interface 104, the packet is directed to one of NAT64 devices 125, 126 (e.g., NAT64 125N). NAT64 device 125A receives the packet, extracts the IPv4 destination address from the packet and identifies the IPv6 destination address associated with the IPv4 destination address from the packet. Continuing the example above, the IPv4 destination address is the value "92.0.0.1". NAT64 device 125A accesses database server 127A and identifies the value "2001:DB:1:1::4" as the IPv6 address associated with "92.0.0.1". NAT64 device 125A generates an IPv6 packet based on the IPv4 packet, includes the value "2001:DB:1:1::4" as the IPv6 source address, and outputs the IPv6 packet over IPv6 interface 103.

In another example, the IPv4 destination address extracted from the received IPv4 packet is the value "44.0.0.1". NAT64 device 125 may determine that no entry in translation table 150 includes the value "44.0.0.1". NAT64 device 125 performs a DNS resolution for an A record on the IPv4 address "44.0.0.1" (e.g., a reverse DNS lookup) to retrieve the hostname associated with the IPv4 address. In one example, NAT64 device 125 will receive the hostname "s1.yoursite.com". The value "s1.yoursite.com" is included within translation table 150. NAT64 device 125 accesses database server 127A and identifies the value "2001:DB1:1::3" as the IPv6 address associated with "s1.yoursite.com". NAT64 device 125A generates an IPv6 packet based on the IPv4 packet, includes the value "2001:DB1:1::3" as the IPv6 source address, and outputs the IPv6 packet over IPv6 interface 103.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, (e.g., non-transitory media) and not signals, carrier waves, or other transient media.

Various embodiments have been described. These and other embodiments are within the scope of the following claims.

What is claimed is:

1. A method comprising:
    storing, within a translation data center, data defining a mapping that associates each of a plurality of globally routable network-layer addresses for a translation data center to a respective globally routable network-layer address for a corresponding one of a plurality of content providers;
    receiving, with the translation data center and from a client device via a first public network, a packet specifying a request for content from a content provider of the plurality of content providers, wherein the packet conforms to a first network-layer protocol and specifies a globally routable network-layer destination address associated with the translation data center that provides translation services for network-layer protocols, and wherein the client device operates in accordance with the first network-layer protocol;
    performing, with the translation data center and using the mapping, network address translation to select a globally routable network-layer destination address for the content provider associated with the globally routable network-layer destination address associated with the translation data center specified in the packet, wherein the network-layer destination address for the content provider conforms to an address format specified by a second network-layer protocol;
    transforming, with the translation data center, the packet from conforming to the first network-layer protocol to conforming to the second network-layer protocol and replacing the network-layer destination address associated with the translation data center with the network-layer destination address for the content provider in the packet; and
    forwarding, via a second public network, the transformed packet from the translation data center to the content provider using the second network-layer protocol.

2. The method of claim 1, further comprising:
    storing, within the translation data center, the plurality of globally routable network address for the translation data center, wherein each of the plurality of globally routable network-layer addresses for the translation data center conforms to an address format specified by the first network-layer protocol; and
    storing, within the translation data center, a plurality of hostnames for a plurality of content providers,
    wherein performing, with the translation data center, network address translation comprises:
    with the translation data center, accessing a first database of the translation data center to identify one of the plurality of the hostnames for the content provider that is mapped to the network-layer destination address associated with the translation data center specified within the packet; and
    with the translation data center, accessing a second database to identify the globally routable network-layer address that is associated with the identified hostname, wherein the globally routable network-layer address conforms to the address format specified by the second network-layer protocol.

3. The method of claim 2, wherein accessing the second database comprises:
    issuing a domain name system (DNS) lookup query to a DNS server using the second network-layer protocol to identify the globally routable network-layer address that is associated with the identified hostname.

4. The method of claim 2, wherein the second database comprises a cache within the translation data center, the method further comprising:
    storing, within the cache, data defining a mapping that associates each of the plurality of hostnames for the content providers to a plurality of globally routable network addresses for the content providers; and
    accessing the cache to identify one of the plurality of network-layer addresses for the content providers that is mapped to the hostnames for the content providers.

5. The method of claim 1, further comprising:
    presenting an interface with a management system executing within the translation data center to receive input defining the mapping between the network-layer destination addresses of the first network layer protocol for the translation data center and the network-layer destination address of the second network layer protocol for the content providers; and
    updating the mapping based on the received input.

6. The method of claim 1, further comprising updating at least one domain name server to install a plurality of records to resolve a respective domain name for each of a plurality of content providers to a different globally routable network destination address associated with the translation data center, wherein the at least one domain name server is located within a first public network that operates in accordance with the first network-layer protocol, and wherein the content providers are located within a second public network that operates in accordance with the second network layer protocol.

7. The method of claim 1, wherein the first public network operates in accordance with Internet Protocol version 4 (IPv4), wherein the second public network operates in accordance with Internet Protocol version 6 (IPv6).

8. The method of claim 1, further comprising:
replacing, with the translation data center, a globally routable network-layer source address associated with the client device with a different globally routable network-layer source address associated with the translation data center, wherein the different globally routable network-layer source address associated with the translation data center conforms to the address form specified by the second network-layer protocol.

9. A data center comprising:
a first network interface to communicate packets conforming to a first network-layer protocol via a first public network to a client device that operates in accordance with the first network-layer protocol;
a second network interface to communicate packets conforming to a second network-layer protocol via a second public network;
a switch fabric;
a database that stores data defining a mapping that associates each of a plurality of globally routable network-layer addresses for the translation data center to a respective globally routable network-layer address for a corresponding one of a plurality of content providers, wherein each of the plurality of globally routable network addresses for the translation data center conforms to an address format specified by the first network-layer protocol and each of the plurality of globally routable network addresses for the plurality of content providers conforms to an address format specified by the second network-layer protocol; and
a plurality of translation devices that provide translation services to translate the packets between the first network-layer protocol and the second network layer protocol, the plurality of translation devices interconnected to the first network interface and the second network interface of the data center by the switch fabric, and each of the plurality of translation devices comprising:
a first interface that receives via the switch fabric packets from the first network interface that conform to the first network-layer protocol and specify globally routable network-layer destination addresses associated with the translation data center;
a translation module that performs, using the mapping, address translation to select globally routable network-layer destination addresses for content providers associated with the globally routable network-layer destination addresses specified within the packets for the data center, wherein the globally routable network-layer destination address for the content providers conforms to an address format specified by the second network-layer protocol;
a protocol conversion module that transforms the packets from the first network-layer protocol to the second network-layer protocol and replaces the globally routable network-layer destination addresses of the translation data center with the globally routable network-layer destination addresses for the content providers; and
a second interface that outputs the transformed packet from the translation device to the second network interface of the data center for forwarding to the content providers using the second network-layer protocol.

10. The data center of claim 9, further comprising a management system that presents an interface to receive input defining the mapping between the network-layer destination addresses of the first network layer protocol for the center and the network-layer destination address of the second network layer protocol for the content providers.

11. The data center of claim 9, further comprising:
a database storing data that maps a plurality of globally routable network address for the data center to a plurality of hostnames for the plurality of content providers, wherein each of the plurality of globally routable network addresses for the data center conforms to an address format specified by the first network-layer protocol,
wherein the translation modules of the plurality of translation devices perform network address translation by at least identifying the hostname for the content providers that are mapped to the network-layer destination addresses of the data center specified within the packets received from the first network interface of the data center, and identifying the network-layer destination address for the content providers that are associated with the hostnames of the content providers wherein the network-layer address for the content providers conform to an address format specified by the second network-layer protocol.

12. The data center of claim 11,
wherein the translation modules of the plurality of translation devices perform network address translation by at least issuing a domain name system (DNS) lookup query to a DNS server using the second network-layer protocol to identify the globally routable network-layer address that is associated with the identified hostname.

13. The data center of claim 11, further comprising:
a cache storing data defining a mapping that associates each of the plurality of hostnames for the content providers to the plurality of globally routable network addresses for the content providers,
wherein the translation modules of the plurality of translation devices perform network address translation by at least accessing the cache to identify the network-layer destination address mapped to the hostname for the content providers.

14. The data center of claim 9,
wherein each of the translation modules automatically maintain a network session table to store information for communication sessions with client devices from which packets are received on the first interface and communication sessions with content providers to which packets are sent on the second interface, and
wherein the session table associates each of the communication sessions with the client devices to a respective communication session with the content providers.

15. The data center of claim 9, wherein the first network-layer protocol comprises the Internet Protocol version 4 (IPv4) and the second network-layer protocol comprises Internet Protocol version 6 (IPv6).

16. The data center of claim 9, wherein the data center is located within a service provider network.

17. The data center of claim 9, wherein the protocol conversion module replaces globally routable network-layer source addresses specified in the packets with globally routable network-layer source address associated with the translation data center, wherein the globally routable network-layer source addresses specified in the packets conform to an address format specified by the first network-layer protocol, and wherein the globally routable network-layer source addresses associated with the translation data center conform to the address format specified by the second network-layer protocol.

18. A system comprising:
a translation data center coupled to a first public network and a second public network, wherein the first network includes a plurality of client devices and operates in accordance with a first network-layer protocol, and wherein the second network includes a plurality of content providers and operates in accordance with a second network-layer protocol, and
a domain name system (DNS) server located within the first public network, the DNS server comprising a database that stores a plurality of records that resolve a respective domain name for each of a plurality of content providers to a different globally routable network destination address associated with the translation data center in response to receiving DNS queries from the plurality of client devices,
wherein the translation data center receives packets received from the first public network and performs address translation to select network-layer destination addresses for content providers based on network-layer destination addresses of the translation data center specified within the packets, wherein the network-layer destination addresses of the translation data center conform to an address format specified by the first network layer protocol and the network-layer destination addresses for the content providers conform to an address format specified by the second network-layer protocol, and
wherein the translation data center transforms the packets from the first network-layer protocol to the second network-layer protocol and replaces the network-layer destination addresses of the translation data center with the network-layer destination addresses for the content providers.

19. The system of claim 18, further comprising:
a second DNS server located within the second public network,
wherein the translation data center issues a second set of DNS queries to the second DNS server to determine the destination addresses of the content providers in accordance with hostnames of the content providers.

20. A non-transitory computer-readable medium comprising instructions for causing a programmable processor to:
store data defining a mapping that associates each of a plurality of globally routable network-layer addresses for a translation data center to a respective globally routable network-layer address for a corresponding one of a plurality of content providers;
receive, from a client device via a first public network, a packet specifying a request for content from a content provider of the plurality of content providers, wherein packet conforms to a first network-layer protocol and specifies a globally routable network-layer destination address associated with the translation data center that provides translation services for network-layer protocols, and wherein the client device operates in accordance with the first network-layer protocol;
perform, using the mapping, network address translation to select a globally routable network-layer destination address for the content provider associated with the globally routable network-layer destination address associated with the translation data center specified in the packet, wherein the globally routable network-layer destination address for the content provider conforms to an address format specified by a second network-layer protocol;
transform, with the network-based translator, the packet from conforming to the first network-layer protocol to conforming to the second network-layer protocol and replacing the globally routable network-layer destination address associated with the party translation data center in the packet with the globally routable network-layer destination address for the content provider; and
forward, via the second public network, the transformed packet from the translation data center to the content provider using the second network-layer protocol.

* * * * *